United States Statutory Invention Registration [19]

[11] Reg. Number: H615

Feinleib et al. [43] Published: Apr. 4, 1989

[54] HIGH SPEED/LOW LIGHT WAVEFRONT SENSOR SYSTEM

[75] Inventors: Julius M. Feinleib, Cambridge; Lawrence E. Schmutz, Watertown, both of Mass.

[73] Assignee: The United States of America as represented by the Secretary of the Air Force, Washington, D.C.

[21] Appl. No.: 146,891

[22] Filed: Jan. 22, 1988

[51] Int. Cl.[4] ..... G01J 1/00; G01J 1/20

[52] U.S. Cl. ..... 356/121; 250/201

*Primary Examiner*—Stephen C. Buczinski
*Assistant Examiner*—Linda J. Wallace
*Attorney, Agent, or Firm*—William G. Auton; Donald J. Singer

[57] ABSTRACT

A scalable, low light, high speed wavefront sensor system is disclosed for real time sensing of optical wavefronts using: a gateable image intensifier tube (GIIT), a monolithic lenslet array (MLM), a custom high speed switched silicon detector array, high speed analog/digital processing components, which are microprogrammed with signal processing algorithms. The incoming wavefront is reimaged by foreoptics, then divided into multiple subapertures by the use of the MLM. The MLM forms N×M target images which are intensified and transferred to a detector array in which the centroid of each target image on the pixels of the detector array define the local tilt aberration of the wavefront in each subaperture. This local tilt in each subaperture is calculated with microcoded implemented algorithms using real time processing electronics. By combining the local tilt in each subaperture with wavefront reconstruction techniques, the conjugate phase map of the original wavefront can be produced for adaptive optic applications. In order to sense a desired wavefront, the "time of arrival" and flux of the incoming beam can be controlled by the processor via the time and duration of the signal to the GIIT.

5 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH SPEED/LOW LIGHT WAVEFRONT SENSOR SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to adaptive optics systems, and more specifically to a wavefront sensor system which may be used for real time sensing of optical wavefronts.

Light beams, which are sensed by optical detectors, are subject to distortion from a number of sources. These sources of distortion include both the atmosphere and the optical elements of the optical detectors themselves.

The task of eliminating distortion of sensed wavefronts is alleviated to some extent by the systems disclosed in the following U.S. Patents, the disclosures of which are incorporated herein by reference:

U.S. Pat. No. 4,141,652 issued to Feinleib;

U.S. Pat. No. 4,399,356 issued to Feinleib et al; and

U.S. Pat. No. 4,490,039 issued to Bruckler et al.

In the apparatus of U.S. Pat. No. 4,141,652, a modulated reference beam from a laser is combined with an incoming beam of light. The combined beam is then processed into a detectable AC signal and divided into a plurality of beams by subaperture dividing components and is detected by an array of photodetector cells for measuring the position of both the focused incoming beam and the reference beam. The difference between the relative position of the incoming beam and the reference beam is indicative of the distortion in the system and is used to provide a signal to compensate for such distortion.

The system of U.S. Pat. No. 4,399,356 employs an image divider divided in "N" segments ("N">1) which are focused on "N" detector arrays and detected by "S" detectors in the "N" detector arrays. Like the system of the Feinleib et al '652' reference, the detected signals are used to produce a signal proportional to the tilt of the wavefront to correct distortions in the wavefront. The Feinleib et al '356' reference divides the combined beam into multiple segments for the detector arrays using a prism. Each individual detector array measures a localized tilt of the incoming beam to provide a signal that may be used to correct the distortions of the incoming beam.

The Bruckler et al reference discloses the use of a large number of photosensitive elements for locating more accurately source and reference beam spots. The centroid of each source beam spot from each sub-front of the reference beam is computed by an algorithm to yield a measure of the degree of source beam aberration. While the system of Bruckler et al is instructive, it does not seem to provide for continuous calibration and correction of wavefront distortions.

In view of the foregoing discussion, it is apparent that there currently exists a need for a wavefront sensor system which continuously measures the distortions of sensed wavefronts, and which senses the localized tilt of sensed wavefronts, so that the optical distortion of the original wavefront can be removed. The present invention is intended to satisfy that need.

SUMMARY OF THE INVENTION

The present invention is a pulsed integrating imaging irradiance ($PI_3$) wavefront sensor for real time sensing of optical wavefronts. One embodiment of the invention is a scalable, low light, high speed wavefront sensor system that includes: a reference laser, a modulator, a beam combiner, foreoptics, a monolithic lenslet array, an image intensifier, a detector array, and high speed analog/digital processing components.

The beam combiner receives and combines a reference laser beam, from the reference laser, with an incoming target beam to produce a combined beam. The combined beam is reimaged by the foreoptics onto the monolithic lenslet array, which divides it into multiple subaperture signals.

The image intensifier intensifies the multiple subaperture signals for the detector array. The detector array is an array of high speed, silicon photodetector cells which detects and measures the centroid of each target image in each subaperture. The localized measure of each centroid in the subaperture provides information regarding the local tilt of each subaperture signal with respect to the detector array, which yields a phase map of the original wavefront devoid of the aberrations induced into the wavefront as it is processed through the foreoptics.

This correction of detected wavefronts is made possible by the inclusion of the reference laser beam with the detected waveform. Since the reference laser beam has known characteristics, the aberrations induced into the referenced laser beam are measurable by the detector array. It is presumable that the same tilt errors manifested by the reference laser beam, have been induced by the foreoptics onto the incoming target beam. Once these tilt errors are known, they may be subtracted by the data processor from the target beam data. The result is an automatic and continuous correction of distortions in sensed wavefronts by a wavefront sensor system.

It is an object of the present invention to provide a wavefront sensor system for real time sensing of optical wavefronts.

It is another object of the present invention to provide continuous correction of sensed wavefront signals from distortions produced by the optical elements of the wavefront sensor system.

It is another object of the present invention to provide continuous correction of distortions of sensed optical wavefronts.

These objects, together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a high speed, low light waveform sensor system for real time sensing of optical wavefronts.

Figure 1:
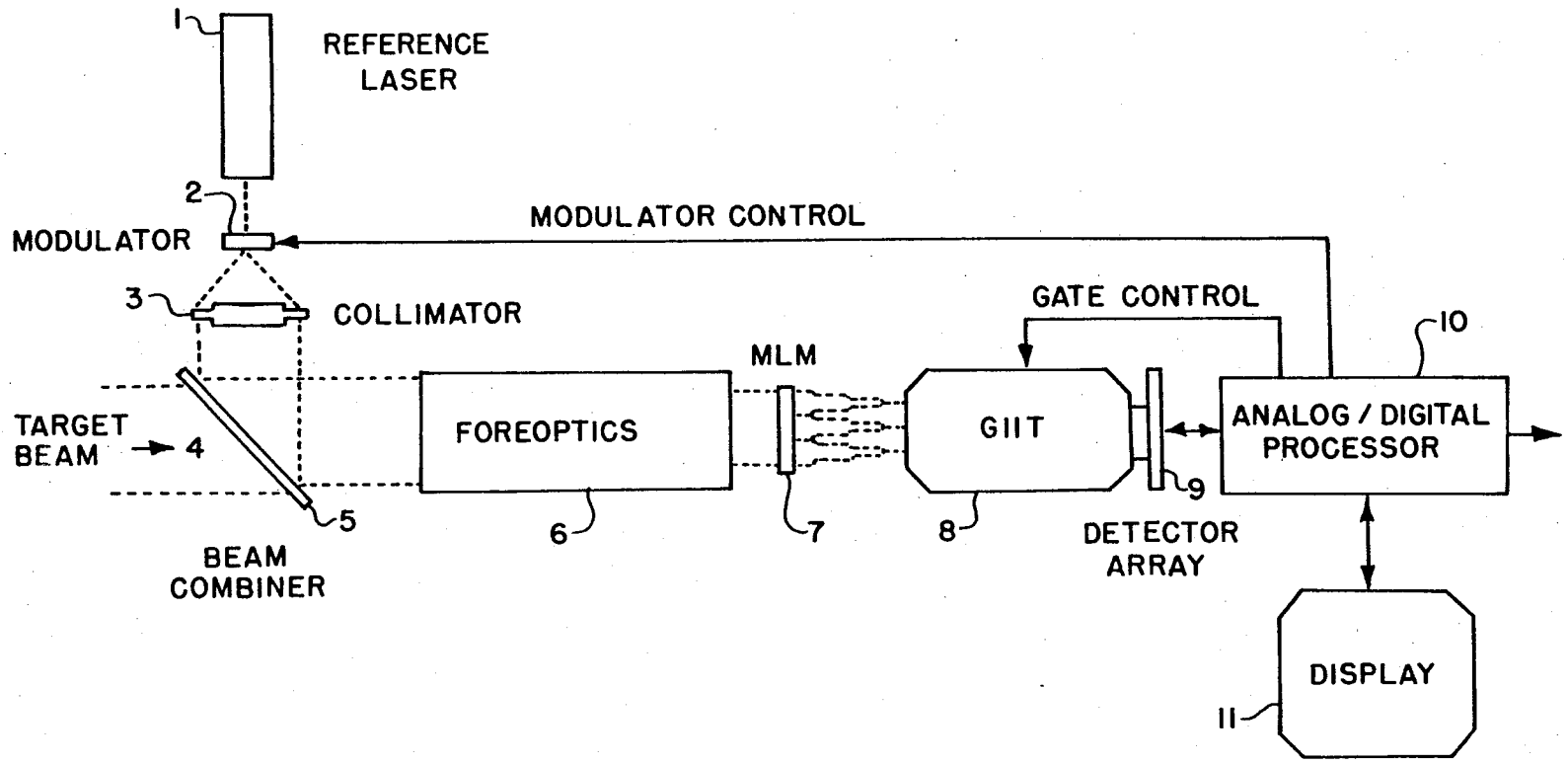
FIG. 1 is a block diagram of an embodiment of the present invention.

The reader's attention is now directed towards FIG. 1, which is a block diagram of an embodiment of the invention. The components of the system of FIG. 1 include: a reference laser 1, a modulator 2, a collimator 3, a beam combiner 5, foreoptics elements 6, a monolithic lenslet array 7, a gated image intensifier tube 8, a detector array 9, a high speed analog/digital processor 10 and a display system 11.

The beam combiner 5 receives and combines a reference laser beam, from the reference laser 1, with an incoming target beam. As taught in the Feinleib '652' reference, the system of FIG. 1 can be used as a return wavefront measurement system, which uses light returned from an irradiated object to measure aberration in the optical path between the object and the focal plane of the optical system. The system of FIG. 1 can also be used to measure and compensate for the internal optical distortion generated by the foreoptics 6.

The foreoptics 6 are optical elements that receive the combined beam from the beam combiner 5, and reimage it onto the monolithic lenslet array 7. Examples of components that may be part of the foreoptics 6 of FIG. 1 include the focusing mirror described in the Feinleib '652' patent, as well as other elements used currently in the art, including a focusing lens.

Just about any optical components that are used in adaptive optics systems, including the foreoptics 6 of FIG. 1, are potential contributors of optical distortion to incoming wavefronts. Since the reference laser beam has known characteristics, the optical distortion it receives from the foreoptics 6 will be readily apparent, as discussed below.

The monolithic lenslet array 7 receives and divides the focused combined beam, from the foreoptics 6, into $N \times M$ multiple subaperture target images. The function of the monolithic lenslet array is similar to that of the "n" sided prism of the Feinleib et al patent. Also note that an example of a lenslet array is described in the Feinleib '652' patent, cited above. However, in the Feinleib '652' reference, the lenslets focus their respective subaperture components directly onto their respective photodetector cells. In the present invention, the lenslets of the monolithic lenslet array 7 separately focus their respective subaperture components onto an image intensifier 8, for the reasons discussed below.

When the present invention is used as a return wavefront measurement system, the incoming target beam may be a remote object. An obvious example of such a remote target would be a missile, which is being tracked by a laser wavefront tracking system. Whenever the incoming target beam comes from such weak sources, the image intensifier 8 might be necessary to intensify the multiple subaperture target images from the monolithic lenslet array 7 so that the subaperture signals at least exceed a detection threshold of the photosensitive dectectors used in the detector array 9. Additionally the gated image intensifier 8 has a control function. The gated image intensifier 8 is controlled by the data processor 10 to control the time of arrival and flux of the incoming beam. An example of a conventional image intensifier is disclosed in U.S. Pat. No. 4,497,769, which was issued to Nicholson et al, and which is incorporated herein by reference.

The gated image intensifier 8 separately intensifies each of the $N \times M$ multiple subaperture target images from the monolithic lenslet array 7 for the detector array 9. In the detector array 9, the centroid of each target image (on $A \times A$ pixels of the detector array) defines the local tilt aberration of the wavefront in each subaperture.

In the system described above, the monolithic lenslet array 7 encodes the angle of arrival of the incoming wavefront by translating the angle of arrival into positions which are measurable in the subapertures. The detector array 9 measures the position information in each of the subapertures, and forwards subaperture analog measurements for each of the subapertures to the analog/digital processor 10. Each of the subaperture analog measurements are converted into digital, and the local tilt for each subaperture is calculated by the data processor. As discussed above, the local tilt information in each of the subapertures is indicative of the angle of arrival of the target beam. Additionally, by comparing the local tilt of the subaperture target beams with the local tilt of the reference laser beam, the distortion of the target beam by the foreoptics and atmosphere can be determined (as the distortion manifests itself in terms of a local tilt in each of the subapertures). By combining the local tilt information from each subaperture with a reconstruction of the incoming target beam, the conjugate phase map of the original wavefront can be produced for adaptive optics applications.

The above-cited Feinleib and Bruckler et al references include suitable examples of the algorithms which calculate the centroid of a subaperture. The data processor of FIG. 1 also has a control function in the present invention. More specifically, note that both the laser modulator 2 and the gated image intensifier tube 8 are controlled by the data processor 10, as discussed below.

During operation, the processor 10 sends a signal to the modulator 2 directing it to "look" at the reference beam for calibration and alignment of the foreoptics 6. The fixed or "static" aberration in the foreoptics 6 is processed and stored for real time subtraction from subsequent measurements of the incoming beam. This procedure allows the removal from wavefront measurements any optical imperfections in the foreoptics due to minor manufacturing flaws and/or severe thermal drifts over long periods of sensor operation.

In addition to this real time correction of static aberration; system initialization, course calibration and sensor monitoring is achieved via the display computer 11 with a software interface. System initialization is performed with interface software loading the required microcode to the high speed processor 10. System calibration is achieved with the target beam blocked and the reference arm (1,2,3,) on. The display monitors the detector array 9 intensity and the real time wavefront output of the sensor with use of the software interface.

Figure 2:
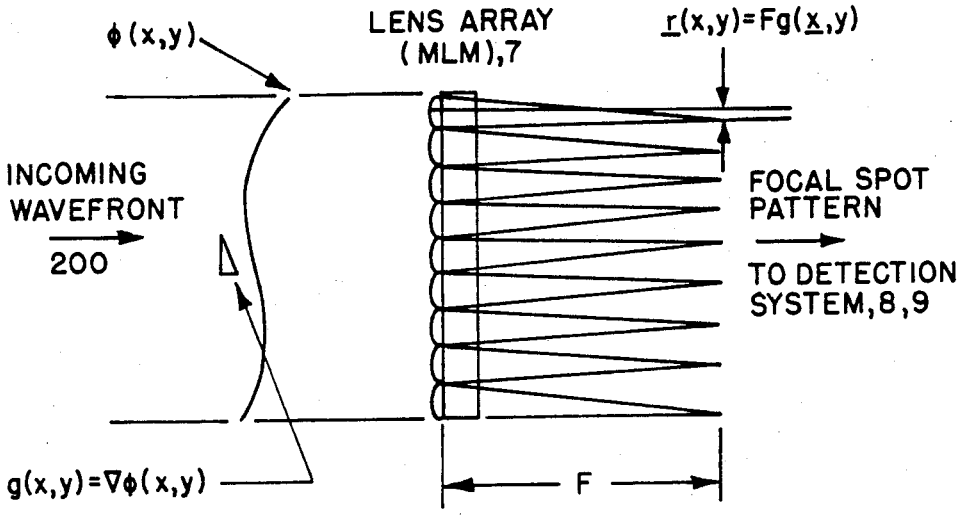
FIG. 2 is an illustration of the Hartmann centroiding technique used in the present invention.

The reader's attention is now directed towards FIG. 2, which is an illustration of the Hartmann Centroiding technique used for the wavefront sensor of the present invention. In the present invention, the definition of multiple subapertures over the full aperture is achieved with a micro array of tightly packed lenses on a single optical substrate called the Monolithic Lenslet Module (MLM). For the intitial low-speed, high light-level demonstration, position sensing of the array of spots formed by the MLM was performed by a standard 2D photodiode array, digitizer and programmable digital processing electronics.

In the diagram of FIG. 2, the incoming wavefront having phase distribution $\phi$ (x,y) impinges on a two-dimensional array of lenses which is located at a pupil plane of the optical system. This lens array is referred to as a Monolithic Lenslet Module, or MLM. Each lens in the MLM intercepts a small segment, or subaperture, of the full system aperture. A 2D array of spots, each spot corresponding to one subaperture, is thereby formed behind the MLM at the lens focal length F. Each spot is an image of the source illumination or target.

For a perfectly flat, tilt-free plane wave ($\phi(x,y)$=-constant), all spots will fall directly on the optical axes of their subapertures. For an aberrated wavefront, each spot is displaced from its nominal position by an amount r(x,y), where r is given by:

$$r(x,y)=Fg(x,y) \quad (1)$$

and g(x,y) is the gradient of the phase distribution:

$$g(x,y)=\nu\phi(x,y). \quad (2)$$

The function of the MLM is to convert the problem of measuring the phase distribution to that of measuring the positions of a 2D pattern of focal spots. Since the measurement yields the gradient of phase rather than the phase itself, another step, called reconstruction, is required to recover an estimate of the phase front. The wavefront sensor system of the present invention outputs the X and Y gradients (tip/tilt) for each subaperture; but, does not perform the phase front reconstruction.

Tables 1 and 2 are examples of sets of performance goals suitable for a working embodiment of the invention.

TABLE 1

| | |
|---|---|
| Number of Subapertures | 9 × 9 (Square Array) |
| Detector Configuration | 45 × 45 pixels* |
| Subaperture Size | 5 × 5 pixels* each |
| Wavefront Measurement Rate | 100 Hz |
| Modes of Operation | Pulsed and Continuous |
| Dynamic Range | ±2.5 pixels* (±2 waves per subaperture) |
| Optical Efficiency | .4 at 633 nm |
| Accuracy | 1.05 times the theoretical limit |

*Pixel size is 100 μm × 100 μm (detector array is a 50 × 50 pixel Reticon with serial output)

TABLE 2

| | |
|---|---|
| Number of Subapertures | 6 × 6 (Square Array) |
| Detector Configuration | 30 × 30 pxels* |
| Subaperture Size | 5 × 5 pixels* each |
| Wavefront Measurement Rate | 2000 Hz |
| Modes of Operation | Pulsed and Continuous |
| Pulse Gate Width | 1 to 500 sec |
| Dynamic Range | ±2.5 pixels* (±2 waves per subaperture+) |
| Optical Efficiency | .06 at 633 nm |
| Accuracy | 1.05 times the theoretical limit |
| Precision | 1.2 times the theoretical photon noise limit |

*Pixel size is 100 μm × 100 μm (Detector Array is a 64 × 64 Pixel Reticon with parallel output)

Referring back to the system of FIG. 1, the detector array 9 measures the position information in each of the subapertures, and forwards subaperture analog measurements for each of the subapertures to the analog/-digital processor 10. Each of the subaperture analog measurements are converted into digital, and the local tilt for each subaperture is calculated by the data processor 10. An example of an appropriate algorithm is discussed below.

Several different algorithms were studied at the beginning of the program and it was concluded that the Weighted Pixel Algorithm (WPA) was best suited for optimum sensor performance. The WPA calculates an X and Y vector output (tilt) for the slope measured over one subaperture. The vector output of the WFS can then be reconstructed to the values needed for driving a corrective element (deformable mirror). The WPA evaluates a discrete implementation of the centroid integral to determine blur spot position. In particular, the x-axis (y-axis) centroid is given by;

$$C_x=\left(\sum_{i=1}^{n}\sum_{j=1}^{n} W_i D_{ij}\right)\Big/\left(\sum_{i=1}^{n}\sum_{j=1}^{n} D_{ij}\right) \quad 3$$

where;

$W_i$ equals the weighting coefficient for the $i_{th}$ column (row), $D_{ij}$ equals the fractional portion of the power received by that pixel, and n equals the number of pixels in a row (column) of a subaperture.

Figure 3:
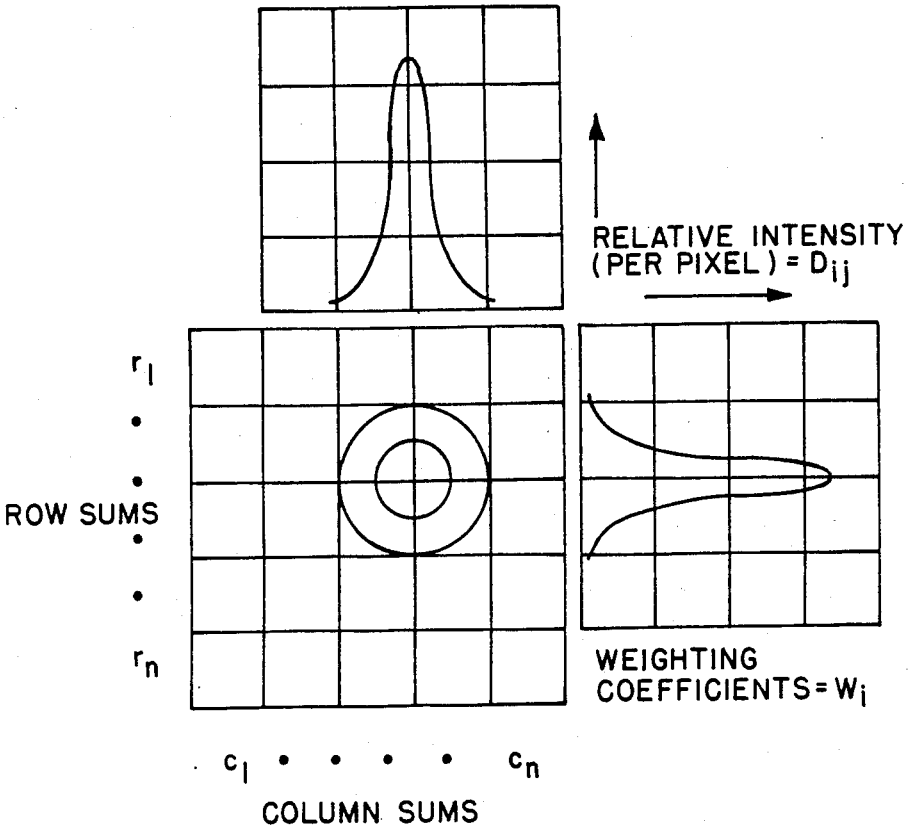
FIG. 3 is an illustration of three charts which depict the derivation of information by the Weighted Pixel Algorithm.

A similar expression for the y axis centroid can be evaluated, as indicated in FIG. 3. FIG. 3 is an illustration of the principles of the Weighted Pixel Algorithm, as described above. Note that all the pixels in a vertical column require the same $W_i$ and therefore a column sum of $D_{ij}$'s can be taken and then multiplied once by $W_i$ to reduce the computational burden. The centroids may be determined as follows: Centroids are given by:

$$C_x=(W_1c_1+\ldots+W_nc_n)/(c_1+\ldots+c_n) \quad (4)$$

$$C_y=(W_1r_1+\ldots+W_nr_n)/(r_1+\ldots+r_n) \quad (5)$$

where $$\sum_{i=1}^{n}\sum_{j=1}^{n} D_{ij}=\sum_{i=1}^{n} r_i=\sum_{i=1}^{n} c_i \quad 6$$

By using the WPA equation defined above, we simulate the algorithm output with the introduction of known amounts of input wavefront tilt applied along one axis. This input wavefront tilt is translated to motion of subaperture blur spots formed by the MLM. The blur spot motion across a subaperture varies the amount of intensity detected by each pixel in that subaperture. The intensity at each pixel is weighted (scaled) according to its position in the subaperture which allows the WPA to calculate the centroid position of the blur spot. Plotting the input tilt vs. the WPA output tilt gives the tilt transfer function curve. The tilt transfer function maps the measured WPA output against an applied input and is a function of several parameters—pixel size, subaperture size, blur spot size, and the weighting coefficients. The perfect or ideal response for the tilt transfer function is linear; where input tilt equals output tilt. Given a fixed detector pixel size of 100 μm×100 μm square, we optimized through simulation the WPA parameters for the desired tilt dynamic range and accuracy using a minimum number of pixels to define the subaperture size.

The precision of the tilt measurement is governed by the spatial fluctuation of primary photons and the temporal fluctuation of the supporting electronics. A brief discussion is presented below of the wavefront sensor (WFS) in terms of the optical and electronic parameters. The original calculation of the contribution due to photon noise assumed that there was no spatial effect from photo-intensification. Further analysis has shown that this is not strictly true; but, the effect is bounded and known to be small. An analysis without intensifier noise effects is summarized and explained below.

The WPA subaperture tilt algorithm definition, including terms which model the intensifier gain and the specific optical set-up used is:

t=tilt=x (or y) centroid of intensity distribution (in units of waves), $$t = \alpha\left[\frac{W_i[Gn_i + \Delta e_i]}{[Gn_i + \Delta e_i]}\right] \quad 7$$

where i=1,2,3,4,5, the columns (or rows) of the detector array;

$W_i$=coordinate of the column (row): −2d, −1d, 0d, 1d, 2d;

d=width of column (row) (i.e. width of one detector array element);

G=photo-event to photon gain of the image intensifier;

$n_i$=number of photo-events in column (row) i;

$\Delta e_i$=variation due to electronics noise in column (row) i (in units of secondary photons); and, $\alpha$=the reciprocal of the transfer curve slope or conversion of length from detector coordinates to waves.

By expanding $n_i$ in terms of a mean number of photo-events, $<n_i>$, and the fluctuation around the mean number of photo-events, $\Delta n_i$, we substitute for $n_i$ into equation 7 with the expansion:

$$n_i = <n_i> + \Delta n_i \quad (8)$$

So the tilt equation becomes:

$$t = \alpha\frac{\Sigma W_i[G(<n_i> + \Delta n_i) + \Delta 3_i]}{[G(<n_i> + \Delta n_i) + \Delta e]} \quad 9$$

Expansion of the denominator with Taylor series about N, where $$N = <n_i>, \quad (10)$$

and assuming the photo-events is a known Poisson process with electronic noise as a zero mean Gaussian process. It can be shown for 25 detectors (pixels) per subaperture that the variance of the tilt is written:

$$\mathrm{var}(t) = \alpha^2\beta^2(N^{-1} - 2N^{-2}) + \alpha^2 N^{-2}G^{-2}\sigma^2(50d^2 + 25<x>^2) + O(N^{-3}), \quad (11)$$

where the terms in equation 11 are defined:

$$\alpha^2 = (<t>/<x>)^2,$$

here <x> is the mean tilt position measured in detector units;

$$\beta^2 = \sum_{i=1}^{5} d_i(W_i - <x>)^2,$$

or variance of the centroid position with, $d_i$=the number of secondary photons falling into row i of the detector array;

N=$<n_i>$;

G=photo-event to photon gain of the image intensifier;

$\sigma^2$=the variance due to electronics noise in each of 25 detector elements:

d=width of column (row) (i.e. width of one detector array element);

and $O(N^{-3})$ refers to higher order terms.

For equation 11, we identify the first term as due to photon spatial fluctuation ($P^2$), the second term as due to the electronics noise ($E^2$), and the third term ($O(N^{-3})$) as negligible third order effects. Finally, we define sigma delta lambda as:

$$\sigma\Delta\lambda = \mathrm{var}(t) = \sqrt{\alpha^2\beta^2(N^{-1} - 2N^{-2}) + \alpha^2N^{-2}G^{-2}\sigma^2(50d^2 + 25<x>^2)} \quad 12$$

$$= \sqrt{P^2 + E^2}\,. \quad 13$$

Returning to the system of FIG. 1, a function of the digital processor is to use an algorithm for determining the centroid position of a blur spot imaged onto a field of n×n pixels. This pixel field defines a subaperture in the wavefront sensor. Of the alternatives available, we concluded that the Weighted Pixel Algorithm (WPA) was superior due to its computation speed and performance in meeting the invention requirements.

Initial evaluation of subaperture size was conducted for the 6×6 pixels (detectors) defining a subaperture. The optimum performance for the 6×6 case was achieved with a 100 m peak to first null blur spot with the WPA weighting coefficients being ±131, ±75, and ±25 as integer values. The WPA, with these parameters, exceeds both the tilt dynamic range and transfer function linearity requirements and produced a precision of 1.3 times the theoretical photon limit.

The detector used in one embodiment of the present invention is Reticon's 50×50 quartz window switched silicon diode array which was purchased with its own clocking and amplification circuitry. Modifications were made to the standard preamp and clocking circuits in order to achieve uniform and quiet operation of the detector framing at 300 Hz. The detector is read out on one serial video line at a 1.2 MHz pixel rate. A raster scan operation allows an image display of detector output on an oscilloscope without need of the digitizer or processor.

The digitizer used is Analog Devices CAV-1210; a 10 MHz, 12-bit A/D converter. A support board was built for the A/D converter to condition the video signal input and convert the CAV-1210 ECL output to TTL signal levels. The digitizer operates at 10 MHz; thus, allowing oversampling of the detector input for optimum sampling of a pixel.

A MassComp 566 is used as the host computer for microcode development and download to the PMP. The host also serves as an interface to the sensor to monitor detector output, vector output and processing of test data. Details of the host software to perform these functions are described below.

With the Reticon 64×64 array, a 32×32 quadrant is used to frame at a wavefront measurement rate of 2 kHz. The detector MUXs 4 to 1, outputting 8 video lines. These video signals are amplified, conditioned, MUXed 8 to 1 into the 12-bit, 10 MHz digitizer (CAV-1210) and sent to the processor. The processor maps into memory 36 subapertures (6×6 region) with each subaperture containing 25 (5×5) detector values. From memory, three parallel data streams, 12 subapertures each, are processed to output tip/tilt data with dark current offset subtract, detector gain normalization, vector reference subtract, and the Weighted Pixel Algorithm (WPA) in 100 μs or less. Host computer interface via RS-232 I/O to the PMP is maintained for μcode download, system control, diagnostics, and data display routines.

Statpack is a commercially available statistical computation and formatting package, which is used to provide all the standard statistical manipulation functions, together with the capability of acquiring raw sensor data and casting the results into various output formats. Statpack will calculate the mean, standard deviation, root mean square, sample skew, and kertosis on an input sample. It will also calculate vector magnitude for a tilt sample, perform a software reference subtraction of one data file from another, and calculate correlation coefficients. The format of the statpack routines is such that data from one computation can be readily passed to another. The output can be either printed, plotted, or stored on the host computer.

Statpack is used with the sensor for full aperture tilt data collection, reduction, and plotting of individual subaperture transfer functions, precision, and standard deviation. A table of transfer function gains; the correlation coefficients; and the y-intercepts is also compiled for X and Y axes in all the subapertures from each full aperture tilt data run.

Two display programs allow a visual representation of the wavefront sensor output on a color graphics monitor. The first program, camdis, is a camera display utility which allows the user to upload a buffer of detector data from the PMP, and displays the image on the color monitor. Camdis is used for system integration, alignment, and monitoring.

The second program, vecdis, is a vector display utility which allows the user to grab the calculated X and Y tilt values from the PMP and display this output on the graphics monitor. The display consists of vectors in subapertures offset by the corresponding XY tilt proportional to each subaperture. This program is used for system alignment and monitoring.

Both programs are run with configuration files that set parameters to define scaling; size; labeling; number of displays; PMP initialization values and data locations; reference, gain, and offset files; output files; and, number of subapertures or pixels. The configuration file is the key to flexibility in both these programs.

In building the invention, commercially-available equipment should be used wherever possible. Returning to the system of FIG. 1, the gated image intensifier tube 8 should be characterized as having gating repeatability over 1 to 500 microseconds, and should provide an effective photon gain of up to 100,000. For all practical purposes, the low light level of performance of the present invention is limited by the photon gain of the intensifier tube, and the coupling efficiency of the tube output to the detector array. As indicated above, the detector array used in one example of the invention is the commercially-available Reticon detector array. Similarly, to meet the low light requirements of the invention, a light amplification device that preserves image quality is required. Three stage assemblies were designed from Varo Electron Devices and subsequently potted and tested.

Figure 4:
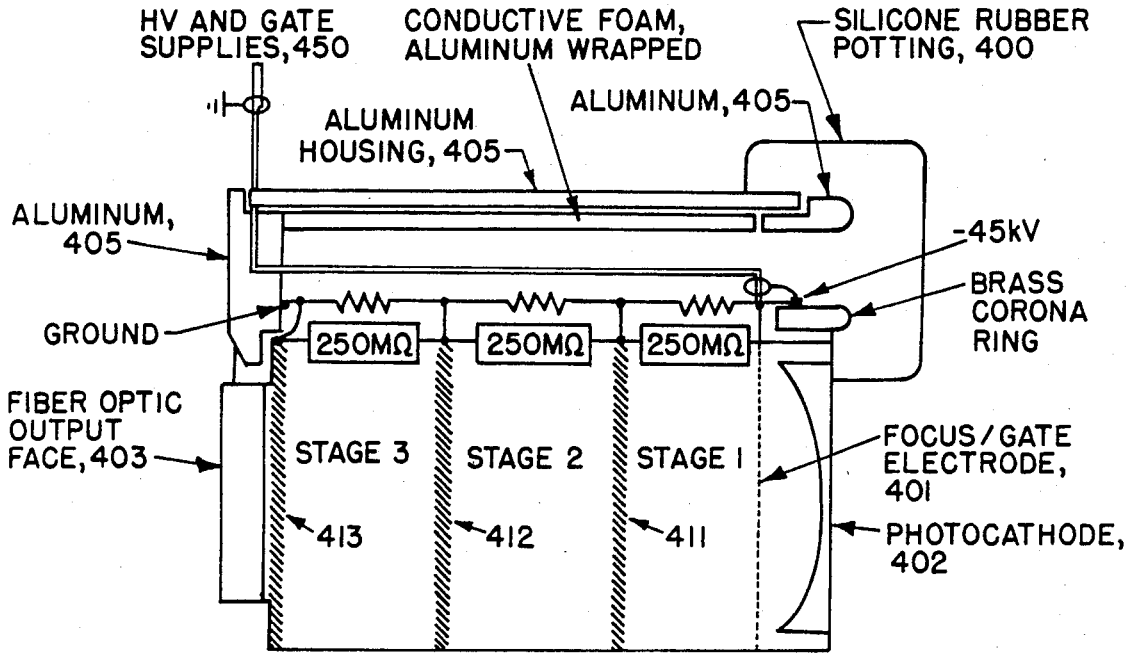
FIG. 4 is a cross-sectional view of a three stage gated image intensifier tube.

FIG. 4 is a cross sectional view of the three stage gated image intensifier tube which was designed to provide the required photon gain. The tubes are potted in a rigid enclosure with silicon rubber high voltage insulation 400. A high voltage pulsable power supply provides power and the capability of high speed tube gating.

The image intensifier tube of FIG. 4 is a 25 mm three stage gated tube. The input face of the first stage is a curved glass window, 25 mm in diameter, with an S-20 photocathode 402 on the inside surface. Photons hit the photocathode producing electrons which are accelerated through a 15 kV field and imaged by electron optics. The electrons then hit a curved P-46 phosphor on the back end of the stage and produce a brighter image there. The last element of each stage is a fiber optic plug that couples the curved electron optic focal plane to a flat image plane.

The first stage of each assembly has a gate electrode that provides an extinction ratio of $10^4$. The gate electrode 401 floats on the −45 kV required to power the tube (15 kV per stage) and swings from 350 volts for turn on and tube focus to −1,800 volts when the tube is gated off. The second and third stages are distortion corrected but distortion correction for gatable stages is unavailable. The three stage assemblies are potted in an aluminum tube 4 inches in diameter. For safety considerations the input face, which is the −45 kV end, is recessed ¾ inch in the housing and rounded metal flanges are potted in the enclosure for field control. Three high voltage resistors divide the voltage and bleed off the high voltage when the tube is powered down. The output face of the tube 403 is at ground potential and protrudes ¼ inch beyond the enclosure.

The inputs to the second and third stages are also fiber optic plugs that are butted to the output plug on the previous stage. Optical properties such as photon gain, magnification, distortion, resolution and point spread function are measured and the electrical characteristics of the associated power supplies are presented below in Table 3. Each of the individual stages are single, commercially-available image intensifier tubes which are optically connected by the fiber optic plugs positioned between them. Collectively, the multiple image intensifiers provide the required photon gain for the wavefront sensor in low light applications. As mentioned above, the effective photon gain required of one embodiment was 100,000. The way to achieve this comparatively high photon gain is to optically combine multiple image intensifiers as illustrated by the three stage gated image intensifier system of FIG. 4.

TABLE 3

| Summary of Measured IIT Characteristics | |
|---|---|
| Gain | |
| Photon to Photon green light gain | 260 |
| Detected Photon gain | 1,900 |
| Varo's gain* | 1,337 |
| Magnification | 0.78 |
| Distortion at 7 mm | 4.6Δ |
| at 10 mm | 10Δ |
| at 11.2 mm | 14Δ |
| Resolution | 28 Ip/mm at 3Δ MTF |
| Point Spread Function | 60 microns (from 3Δ to 3Δ) |
| Phosphor Decay (P-46) from 100Δ to 10Δ intensity level | |
| Single photon event | 100 ns |
| Normal operating condition | 5 μs |
| Gate Turn Off | 500 ns max |

*Varo Electron Devices measures tubes for luminance gain at 2870° K

The wavefront sensor of the present invention is characterized as detecting low light phenomena at high speed. The low light detection characteristics were discussed above in conjunction with the gated image intensifier tube description. The high speed performance characteristics are discussed below.

Figure 5:
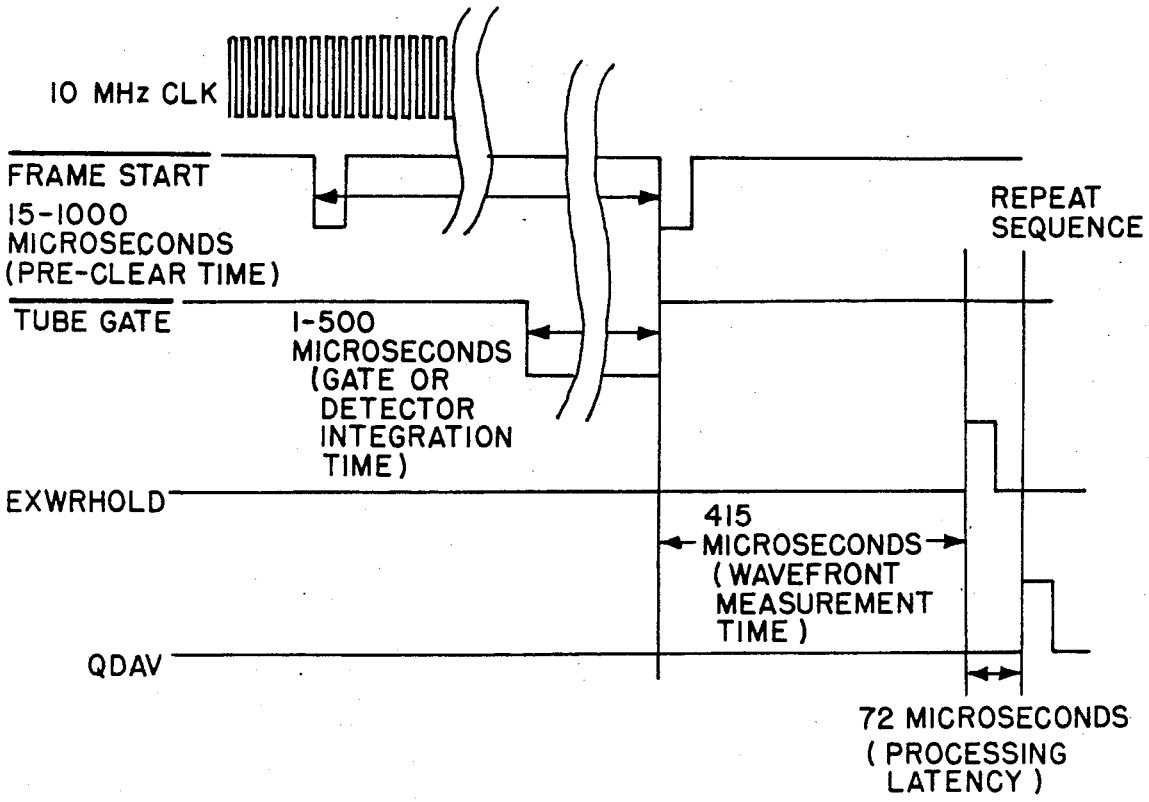
FIG. 5 is a system timing diagram which includes a chart of the processor signals used in the present invention.

The 64×64 Reticon wavefront measurement time (rate) was measured to be 415 μs (2.41 kHz) for the 32×32 pixel quarter readout. The processing latency of all 36 subapertures from the first detector value out of the QMM to the last tilt vector out of the D/S was measured to be 72 μs. FIG. 5 shows the timing diagram of both wavefront measurement time and processing latency.

FIG. 5 is a chart of the processor signals, as depicted in a system timing diagram. The Frame Start signal initiates two frames of detector data for one wavefront measurement sequence. The first is a pre-clear frame which dumps any excessive charge that has accumulated on the detector array while waiting to measure and process data. This pre-clear frame would not be necessary if the sensor was run in a continuous mode; but is required for pulsed mode applications where the detector is idle for long periods of time (greater than 1 millisecond). The second frame in the Frame Start sequence measures the wavefront which is then processed for XY tilt in each subaperture. This sequence is repeated for the next wavefront measurement. The 415 μs frame time is due to the use of one 10 MHz digitizer in this system. If four 10 MHz digitizers were used in parallel to convert the 32×32 detector data field, the frame time would be reduced to 104 μs (9.6 kHz) for this system with minor μcode (software) modifications to run the processor. This faster frame time (rate) was not attempted in the invention because the 2.4 kHz frame rate exceeded the specified invention goals.

Figure 6:
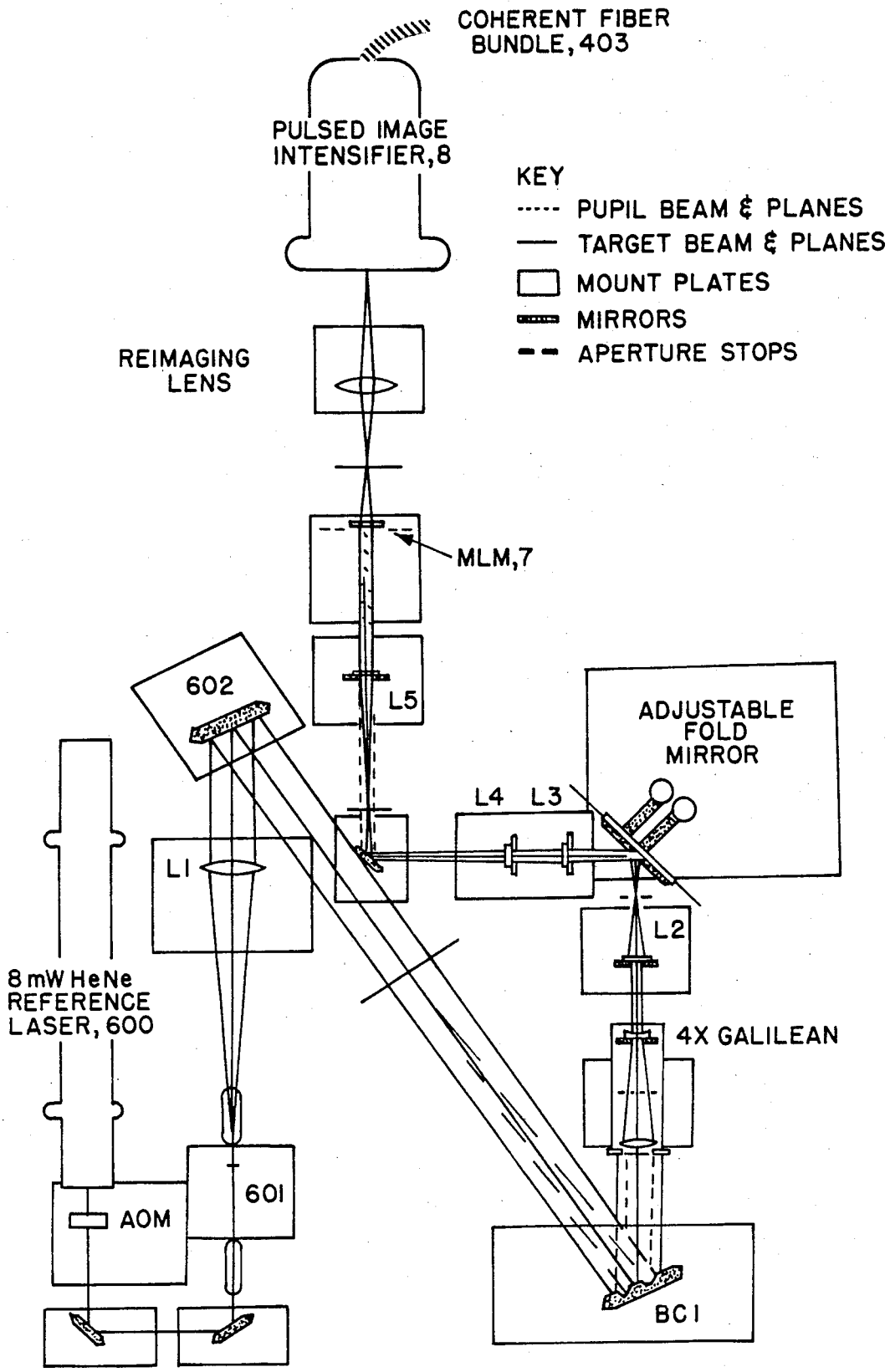
FIG. 6 is an illustration of a system with a detailed identification of the foreoptics elements.

Returning to the system of FIG. 1, the foreoptics 6 are optical elements that receive the combined beam from the beam combiner 5, and reimage it onto the monolithic lenslet array 7. FIG. 6 is an illustration of an example of a system with a detailed reference to each of the foreoptics elements. A brief description of FIG. 6 is presented below. The purpose of FIG. 6 is to describe the optical elements that serve as the foreoptics in FIG. 1. As mentioned above, like elements are given like reference numerals throughout the drawings. This means that monolithic lenslet array 7, and gated image intensifier of FIG. 6 is as described above for FIG. 1, and need not be redescribed here.

A plane wave generator (consisting of a 8 mW HeNe laser 600, opto-acoustic light valve, spatial filter 601, collimating optics L1, and a steering mirror 602) serves as the system reference for measurement and correction of systematic aberrations. Source light enters the wavefront sensor at the beam combiner (BC1). The 50 mm diameter combiner also steers reference radiation into the optical train when a reference is taken. A 4X Galilean telescope following the beam combiner intercepts a 19 mm diameter section of the incoming beam path and reduces it to a 4.75 mm diameter path at the telescope's exit aperture. A relay lens (L2) images a virtual pupil formed in the reduction telescope onto a micrometer adjustable fold mirror. This mirror can be used for system calibration and adjustment since it is positioned at a foreoptic's pupil plane. Lenses L3, L4, and L5 reimage the pupil plane from the fold mirror onto the lenslet array while recollimating the target light at the MLM for wavefront measurement.

The system's input pupil plane is located outside the sensor at a distance of 325 mm from the sensor-side surface of the beam combiner. The foreoptics have a pupil magnification of 2.5X; therefore, a 500 μm subaperture at the MLM is reimaged as a 1.25 mm subaperture at the input pupil plane.

The total residual aberration of the foreoptics is λ/7.1. This is measured by scanning the blur spot formed at the final target plane of the foreoptics. The pupil image resolution is 10 Ip/subaperture. This is determined by placing a high contrast resolution chart at the entrance pupil and observing the image formed at the MLM plane.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A wavefront sensing apparatus capable of sensing wavefront distortion and an angle of arrival of an incoming wavefront, said wavefront sensing apparatus comprising:

a source which produces a reference beam;

a means for combining said reference beam from said source with said incoming wavefront to produce a combined wavefront;

a means for dividing said combined wavefront from said combining means into multiple subaperture wavefront images;

an image intensifier which receives and intensifies said multiple subaperture wavefront images above a detection threshold level, to produce thereby intensified multiple subaperture wavefront images with a plurality of incoming wavefront spots and reference beam spots indicative of tilt angles of said incoming wavefront and said reference beam in each subaperture;

a detector array which produces measurement signals which indicate an incoming beam centroid and a reference beam centroid for each subaperture by an optical detection of said intensified multiple subaperture wavefront images received from said image intensifier, said detector array being characterized by having a detection threshold which must be exceeded for optical signals to be detected by the detector array; and a means for calculating said angle of arrival and said wavefront distortion of said incoming wavefront from said incoming beam centroid and said reference beam centroid of said multiple subaperture wavefront images, said calculating means receiving and converting into digital said measurement signals from said detector array and calculating therefrom said wavefront distortion and said angle of arrival.

2. A wavefront sensing apparatus, as defined in claim 1, wherein said dividing means comprises a monolithic lenslet array containing N×M lenslets which receive and divide said combined wavefront from said combining means into N×M subaperture wavefront images, which are separately forwarded to said image intensifier, and wherein N and M are integers whose product is indicative of a total number of lenslets in said monolithic lenslet array.

3. A wavefront sensing apparatus, as combined in claim 2, wherein said image intensifier includes multiple gated image intensifier tubes which are optically connected together and which sequentially amplify said multiple subaperture wavefront images, said multiple gated image intensifier tubes thereby collectively providing sufficient photon gain to enable said wavefront sensing apparatus to detect low light emissions.

4. A wavefront sensing apparatus, as defined in claim 3, wherein said image intensifier comprises:

a photocathode which receives said multiple subaperture wavefront images from said dividing means, and which outputs an electron stream;

a focus gate electrode which conducts said electron stream from said photocathode;

a first stage image intensifier which produces a first intensified image by amplifying said electron stream from said focus gate electrode;

a second stage image intensifier, which produces a second intensified image by amplifying said first intensified image received from said first stage image intensifier;

an output stage image intensifier which produces said intensified multiple subaperture wavefront images by amplifying said second intensified image received from said second stage image intensifier;

a means for optically connecting said first, second and output stage image intensifiers; and a means for supplying electrical power to said first, second and output state image intensifiers.

5. A wavefront sensing apparatus, as defined in claim 4, wherein said optically connecting means comprises:

a first fiber optic plug which is butted between said first and second stage image intensifier to optically conduct said first intensified image therebetween; and a second fiber optic plug which is butted between said second and said output stage image intensifier to conduct said second intensified image therebetween.

* * * * *